3,242,133
STABILIZING POLYVINYL HALIDE RESINS WITH A TERPENE AND A SULFUR CONTAINING COMPOUND
William Bryan Lindsey, Tonawanda, N.Y., assignor to E. I. du Pont de Nemours and Company, Wilmington, Del., a corporation of Delaware
No Drawing. Filed Sept. 20, 1961, Ser. No. 139,360
2 Claims. (Cl. 260—45.7)

This invention relates to the manufacture of shaped articles of polymeric halogenated hydrocarbons. More specifically, it relates to the stabilization of the polymeric halogenated hydrocarbons, particularly above their melting temperatures, for successful shaping into articles.

This application is a continuation-in-part of my copending application Serial No. 825,676, filed July 8, 1959, now abandoned.

The invention will be described primarily as it applies to polyvinyl chloride or copolymers of vinyl chloride having vinyl chloride as the major constituent, e.g., copolymers of vinyl chloride with vinylidene chloride, vinyl acetate, vinyl propionate, vinyl laurate, vinyl stearate, etc., and their formation into films for use in packaging applications and the like. However, the invention is equally applicable to polymers and copolymers of vinyl fluoride and may be extended to include all polymeric material whose thermal decomposition is at least partially attributed to the loss of halogen acid from the composition, thereby leading to discoloration; and the shaping of these polymeric materials into films, filaments, fibers, foils, coatings, etc. Besides polymers of vinyl chloride and vinyl fluoride, the invention applies to such polymeric materials as vinylidene chloride polymers, vinylidene chloride-vinyl chloride copolymers, vinylidene fluoride polymers and copolymers, after-chlorinated polyvinyl chloride, chloroprene polymers, chlorosulfonated polyethylene, and the like.

Polyvinyl chloride is characterized by poor thermal stability, particularly at temperatures above its melting point. Thermal decomposition is evidenced by a browning of the normally white polymer. As degradation continues, the polymer becomes progressively darker until charring and substantial degradation occur. This lack of thermal stability presents a serious obstacle to the commercial exploitation of the polymer since the preferred methods of forming shaped structures involve the use of heat.

The object of the present invention is a substantially stabilized polymer that can be formed into shaped structures at elevated temperatures, e.g., by melt or plasticized extrusion, rolling coalescence or solvent casting, without encountering the aforementioned difficulties. A further object is a polyvinyl chloride composition that can easily be melt-extruded into a useful non-toxic film. Other objects will appear hereinafter.

The objects are accomplished by a composition of matter comprising the halogenated hydrocarbon polymer; at least one compound selected from the group consisting of olefinically unsaturated terpenes and oxygen, hydrocarbon and halogen derivatives of olefinically unsaturated terpenes, i.e., olefinically unsaturated terpenes, oxygenated terpenes, halogenated terpenes and hydrocarbon-substituted terpenes; and at least one compound selected from the group consisting of R—S—H and R—S—S—R' wherein R and R' are selected from the group consisting of alkyl, hydroxyalkyl, thioalkyl, carboalkoxyalkyl, haloalkyl, arylalkyl, arylalkaryl, haloaryl, thioaryl, thioalkaryl, carboalkoxyaryl, carboxyaryl, cycloalkyl, furyl, furfuryl and thienyl groups.

Olefinically unsaturated terpenes are meant to include the naturally-occurring and synthetically-prepared olefinically unsaturated terpenes and terpene mixtures. These have the general formula $(C_5H_8)_x$ wherein $x$ may have a value from 2 through 6, and may be monocyclic, bicyclic, tricyclic or polycyclic. The preferred terpene compounds are olefinically unsaturated bicyclic terpenes and oxygen, hydrocarbon and halogenated derivatives of olefinically unsaturated bicyclic terpenes, wherein one ring of the bicyclic terpene contains no more than four carbon atoms. Even more preferred are those terpene compounds fulfilling the above requirements and, in addition, wherein the second ring carries at least one exo-alkylene group.

Beta-caryophyllene, beta-pinene, pinocarveol (a terpene alcohol), and nopadiene (a terpene hydrocarbon), the outstanding compounds for use in the present invention, in addition to having an exo double bond (an exo-alkylene group), are bicyclic, with one four membered ring and fall within the most preferred definition. The first three of these are further distinguished by having the exo double bond attached directly to the larger ring structure of the compound. The distinguishing characteristics common to these compounds will be clearly apparent from their structural formulae:

Beta-caryophyllene

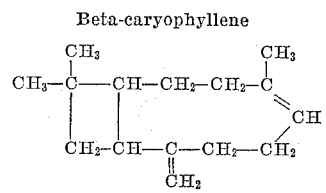

Beta-pinene

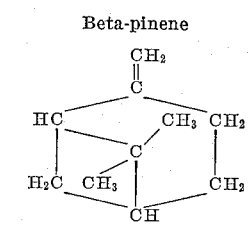

Pinocarveol

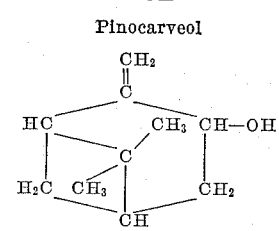

Nopadiene

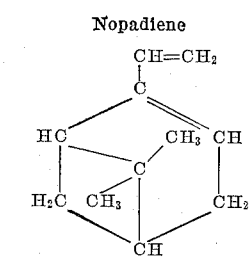

The shorthand formulae for beta-caryophyllene, beta-pinene, pinocarveol and nopadiene are:

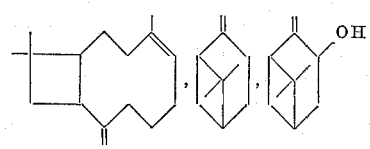

and

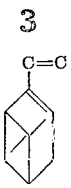

respectively. Other useful terpene compounds in the present invention include: pinocarvone, sabinene, sabinol, alpha-thujene, beta-thujene, alpha-pinene, umbellulone, Δ³-carene, Δ⁴-carene, myrtenol, myrtenal, verbenone, alpha-fenchene, beta-fenchene, camphene, santene, bornylene, apobornylene, cadinene, selinene, di-pentene (d,l-limonene) beta-terpineol, alpha-terpineol, carvone, menthene, bis-abolene, zingiberene, pinocarvyl chloride, myrcene, geraniol, d,l-nerolidol, linalool, citronellol, alloocimene, and citral.

The sulfur-containing organic compound is broadly selected from the group consisting of R—S—S—R' and R—S—H as set forth previously. However, the preferred compounds are the organic thiols, R—S—H, wherein R is selected from the group consisting of alkyl, thioalkyl, carboalkoxyalkyl, cycloalkyl, alkaryl, carboalkoxyaryl, thioaryl and thioalkaryl.

In addition to the thiols disclosed in the subsequent examples, thiols which are operable in this invention include: 1-hexanethiol, 1-octadecanethiol, 2-hexanethiol, 2-dodecanethiol, ethane-1,2-dithiol, propane - 1,3 - dithiol, dodecane-1,10-dithiol, 1,4-dimercaptomethylbenzene, 1,4-dimercaptomethyl - 2,3,5,6 - tetramethylbenzene, beta-phenylethylthiol, triphenylmethanethiol, alpha-mercaptoacetic acid, beta-mercaptopropionic acid, butyl gamma-mercaptopropionate, butyl alpha-mercaptobutyrate, butyl beta-mercaptobutyrate, butyl gamma - mercaptobutyrate, butyl alpha-mercaptophenylacetate, 2-thioethanol, thioglycerol, naphthalene-2-thiol, benzenethiol, o, m, p-thiocresols, 4-tertiary-butylthiol phenols, 4-chlorobenzenethiol, 4-alkoxybenzenethiol, furfurylthiol, ortho-mercaptobenzoic acid, butyl meta-mercaptobenzoate, butyl para-mercaptobenzoate and butyl 4-mercaptophenyl acetate. The most preferred thiols are the higher esters of thioglycolic acid and beta-mercaptopropionic acid, the ester group containing 4–20 carbon atoms.

The amount of terpene or terpene derivative and sulfur-containing organic compound used, particularly for the melt-extrusion of polyvinyl chloride films, should be enough to provide adequate thermal stability during the forming operation but not enough to affect the properties of the resulting film adversely. Concentrations of at least 1% of each of the ingredients of the stabilizer system, i.e. of the terpene or terpene derivative and the thio compound, based on the weight of the additives plus polymer, have been found most useful. The maximum used will depend on the process of forming the shaped structures. However, the maximum concentration of the additives remaining in the ultimate product is preferably no greater than 15%. This means that for melt-extrusion or dispersion-coalescence processes, 2–15% may be used in the starting mixture. In solvent casting, where the additives may be evaporated during formation of the shaped structure, a much higher concentration may be used in the starting composition. In the preferred terpene-thiol stabilizer system, percentages of 4–8% have been found most useful, the ratio of the thiol to the terpene in the stabilizer being from 0.5 to 2.

The surprisingly high degree of thermal stabilization obtained in the compositions of this invention permits forming the compositions into shaped structures at elevated temperatures continuously for long periods of time without encountering objectionable decomposition or discoloration. The compositions thus are uniquely suitable for commercially advantageous high speed, high temperature forming operations such as melt extrusion.

The particular advantages of the synergistic combination of the terpenes and the sulfur-containing compounds over the use of either class of compounds alone follow.

The preferred combinations provide an extraordinarily high degree of stabilization, and have substantially eliminated color formation during even very extended extrusion operations involving polyvinyl chloride and similar halogenated hydrocarbon polymers. Since the sulfur-containing compounds are essentially non-toxic, the non-toxicity of the terpenes is preserved in the combination. This is highly desirable in a composition used to prepare food packaging films.

The process for forming shaped structures involves blending a mixture of the halogenated hydrocarbon polymer, a compound selected from the aforementioned group of olefinically unsaturated terpenes and derivatives of terpenes, and a compound selected from the aforementioned group of sulfur-containing organic compounds; then heating the mixture until it is converted into a homogeneous single phase composition; and, thereafter, forming the homogeneous single phase into a shaped structure and cooling the structure.

Specific embodiments falling within the definition of the process and composition of the invention will be apparent from the following examples. It is understood that the examples should not be considered to limit the scope of the present invention. In the examples, all parts are by weight unless otherwise specified.

EXAMPLE 1

A mixture of 90 parts of polyvinyl chloride resin,[1] 2 parts of "Lubricin" V–3,[2] 5 parts of beta-pinene and 3 parts of isooctyl thioglycolate was prepared by mixing the components in a barrel tumbler for 3 hours. The mixture was extruded at a temperature of 195° C. through a conventional 1" diameter extruder equipped with a 6" flat die and with a 7-mil lip opening and operating with a 50–100 mesh screen pack. Extrusion was continued for a period of 4 hours at which time the film was still clear, essentially colorless and free of bubbles or particles. In a second extrusion run in a large extruder, clear, colorless film, free of bubbles or particles, was obtained during a period of 24 hours.

In a control experiment, a mixture of 98 parts of the same polyvinyl chloride resin and 2 parts of "Lubricin" V–3 was fed into the extruder again heated to 195° C. The mixture was converted to a bubbly, black mass part way through the heated zone to the extruder and could not be extruded due to plugging of the equipment.

EXAMPLE 2

A mixture of 90 parts of polyvinyl chloride resin, 2 parts of "Lubricin" V–3, 5 parts of beta-pinene and 3 parts of tertiary-dodecylmercaptan was prepared by spraying the liquid ingredients onto the polyvinyl chloride resin contained in a barrel tumbler and tumbling the mixture for 3 hours. The mixture was extruded through the same equipment as described in Example 1. The extrusion run was terminated at the end of 5 hours, at which time the film obtained was clear and essentially free of particles.

EXAMPLE 3

A polyvinyl chloride composition was made up with 90 parts of polyvinyl chloride, 5 parts of beta-pinene and 5 parts of isooctyl thioglycolate. One-gram samples of this polyvinyl chloride composition were pressed in a Carver press at 30 tons pressure at 210° C. for varying periods of time, then removed from the press. Films held in the press for as long as 36 minutes were still clear and free of any non-thermoplastic or insoluble particles which would interfere with melt extrusion into a film structure.

EXAMPLE 4

The procedure of Example 3 was repeated except that 5 parts of meta-thiocresol was used in place of 5 parts of

---

[1] Dow 111–4 manufactured by the Dow Chemical Co.
[2] Consisting principally of glycerol triricinoleate manufactured by the Baker Castor Oil Co.

isooctyl thioglycolate. Films from this composition when held in the press for as long as 90 minutes were clear and free of non-thermoplastic or insoluble particles.

EXAMPLES 5–28

The procedure of Example 3 was repeated in the examples summarized in Table I. 90 parts of polyvinyl chloride was mixed with 5 parts of the terpene and 5 parts of the particular thiol. The pressed samples were heated for various lengths of time and then examined for evidence of dark colored, non-thermoplastic particles. The figures in the column "Time" of Table I refer to the duration of pressing time at 210° C. before evidence of polymer degradation occurred.

Table I

| Example | Terpene | Thiol | Time (Minutes) |
| --- | --- | --- | --- |
| 5 | Beta-pinene | Teritary-dodecanethiol | 36 |
| 6 | do | Tertiary-tetradedanethiol | 36 |
| 7 | do | Tertiary-hexadecanethiol | 40 |
| 8 | do | Tertiary-hexanethiol | 45 |
| 9 | do | n-Dodecane-1-thiol | 48 |
| 10 | do | 1-10-Dimercaptodecane | 42 |
| 11 | do | Methane dithiol | 54 |
| 12 | do | Di-tertiary-butyl disulfide | 36 |
| 13 | do | Di-tertiary-butylphenyl disulfide | 39 |
| 14 | do | Mercaptomethyl sulfide | 45 |
| 15 | do | n-Butyl-beta-mercaptopropionate | 65 |
| 16 | do | Dibutylmercaptosuccinate | 55 |
| 17 | do | Glycol dimercaptoacetate | 33 |
| 18 | do | Cyclohexanethiol | 48 |
| 19 | do | Alpha-pinenethiol | 60 |
| 20 | do | Butyl-thiosalicylate | 55 |
| 21 | do | Toluene-3-4-dithiol | 51 |
| 22 | do | Para-tertiary-butylthiophenol | 80 |
| 23 | do | Benzylthiol | 30 |
| 24 | do | 2-Naphthalenethiol | 60 |
| 25 | do | 2½ parts methyl thiophenyl and 2½ parts di-tertiary-butyl disulfide. | 80 |
| 26 | Beta-caryophyllene. | Meta-thiocresol | 45 |
| 27 | Nopadiene | do | 33 |
| 28 | Pinocarveol | do | 30 |

A control containing no terpene compound nor thiol was badly degraded after heating for less than 9 minutes.

EXAMPLE 29

To 9 grams of powdered polyvinyl fluoride there was added 0.5 gram of para-tertiary-butylbenzenethiol and 0.5 gram of beta-pinene. After thorough mixing, a one-gram sample of this mixture was pressed between nickel plates at a pressure of 30 tons and at a temperature of 210° C. for 30 minutes. The plates were chilled in water and the film was removed. The film was clear, free of color and pliable.

A one-gram control sample of polyvinyl fluoride when pressed as described above and held in the press under the same conditions for 15 minutes gave a film which was brown and very brittle.

EXAMPLE 30

A mixture was made from 9 grams of polyvinylidene fluoride with 0.5 gram of para-tertiary-butylbenzenethiol and 0.5 gram of beta-pinene. A one-gram sample of the mixture was pressed at 250° C. for 30 minutes at 30 tons pressure. The resulting film was essentially colorless.

EXAMPLE 31

A mixture of 90 parts of polyvinyl chloride resin, 5 parts of beta-pinene, 3 parts of isooctyl thioglycolate and 2 parts of "Lubricin" V–3 was extruded through an extruder fitted with a circular die at a melt temperature of 210° C. to 215° C. An essentially clear tubing with excellent stiffness and strength characteristics was produced.

EXAMPLES 32–44

A series of melt extrusions was run using the melt extrusion equipment described in Example 1. Mixtures consisting of 90 parts of the polyvinyl chloride resin, two parts of "Lubricin" V–3, 5 parts of a thioorganic compound and 5 parts of various terpenes. The temperatures of extrusion range from 190–205° C. In all cases it was possible to extrude the polymer mixture to form a satisfactory film without plugging the extruder.

Table II

| Example | Thiol | Terpene |
| --- | --- | --- |
| 32 | Isooctyl beta-mercapto propionate | d-Limonene. |
| 33 | do | Dipentene (d,l-limonene). |
| 34 | do | Myrcene. |
| 35 | do | Alpha-pinene. |
| 36 | do | Geraniol. |
| 37 | do | Camphene. |
| 38 | do | Menthene. |
| 39 | Isooctyl thioglycolate | d,l-Nerolidol. |
| 40 | do | Beta-terpineol. |
| 41 | do | Alpha-fenchene. |
| 42 | do | Alloocimene. |
| 43 | Meta-para-t-butyl-thiophenol | Linalool. |
| 44 | do | Carvone. |

EXAMPLE 45

A mixture of 90 parts of 75% vinyl chloride/25% vinylidene chloride copolymer (Dow X–2716 resin manufactured by the Dow Chemical Company), 5 parts of beta-pinene and 5 parts of isooctyl beta-mercaptopropionate was prepared by spraying the liquid ingredients onto the polymeric resin in a barrel tumbler and tumbling the mixture for three hours. A 1-gram sample of this mixture was pressed in a Carver press using 30 tons pressure at a temperature of 210° C. for 30 minutes. The resulting film was removed from the press and cooled. The film was clear, free of color and there were no observable insoluble particles.

In a control experiment, a 1-gram sample of the vinyl chloride/vinylidene chloride copolymer (Dow X–2716 resin) without any additives was pressed in the Carver press using 30 tons pressure at a temperature of 210° C. for 30 minutes. The resulting film was removed from the press and cooled. The film was not clear and had a dark color.

EXAMPLE 46

An 80% vinyl chloride/20% vinyl acetate copolymer was prepared by heating 65 grams of vinyl chloride, 16.5 grams of vinyl acetate, 80 grams of hexane and 0.5 gram of benzoyl peroxide with continuous agitation in an autoclave for 60 hours at 40° C. A mixture of 92 parts copolymer, 5 parts beta-pinene and 3 parts n-dodecyl mercaptan was prepared as in Example 45. A 1-gram sample of the composition was heated in a Carver press at a pressure of 30 tons and at a temperature of 210° C. The resulting pressed film was clear and free from color.

A control 1-gram sample of the vinyl chloride/vinyl acetate copolymer turned black upon being heated similarly in the Carver press.

EXAMPLE 47

A composition of 92 parts of a 75/25 vinyl chloride/vinyl propionate copolymer, the copolymer prepared following the procedure of Example 46, 5 parts of beta-caryophyllene and 3 parts of para-tertiary-butyl thiophenol was extruded at a temperature of 195° C. through a conventional one-inch diameter extruder equipped with a 6″ flat die and with a 7-mil lip opening and operating with a 50-100 mesh screen pack. The extruded film was clear, free of color and showed no particles or evidence of film degradation. By contrast, a control vinyl chloride/vinyl propionate resin that did not contain the terpene/thiol additives turned to a black mass as it passed the heated zone of the extruder to plug the equipment.

EXAMPLE 48

A 65% vinyl chloride/35% vinyl laurate copolymer was prepared following the procedure of Example 4 of U.S. Patent 2,876,895. Five parts of beta-pinene and 3 parts of tertiary dodecyl mercaptan were mixed with 90 parts of the copolymer by spraying the liquid ingredients onto the copolymer resin in a barrel tumbler and tumbling the mixture for 3 hours.

One gram samples of this composition were placed in a Carver press and heated at 30 tons pressure and at a temperature of 210° C. for varying periods of time. The resulting films were free from degradation as indicated by lack of coloration after heating periods as long as 45 minutes. However, a control of the copolymer alone became black after being heated in the press for 10 minutes.

A larger quantity of the composition of copolymer/terpene/mercaptan was extruded through a one-inch diameter melt extruder at a temperature of 195° C. Clear film free of color, bubbles or particles was obtained over a period of 24 hours. In a control, the same copolymer without additives could not be extruded under the same conditions without excessive decomposition.

EXAMPLE 49

A 70% vinyl chloride/30% vinyl stearate copolymer was prepared following the procedure described in Example 1 of U.S. Patent 2,876,895. Five grams of nopadiene and 5 grams of isooctylthioglycolate were incorporated with 90 grams of the vinyl chloride/vinyl stearate copolymer. One-gram samples of this composition were pressed in a Carver press at 30 tons pressure at a temperature of 210° C. for varying periods of time. Films prepared in the press over periods as long as 45 minutes were clear and free of any insoluble particles. The same copolymer alone turned black after being heated in the Carver press under the same conditions for only 10 minutes.

EXAMPLE 50

A composition comprising 75 parts of 86% vinyl chloride/13% vinyl acetate/1% maleic acid terpolymer, 12.5 parts of butyl phthalyl butyl glycolate, 12.5 parts of dicyclohexylphthalate, 3 parts of "Amid" HT (a fatty acid amide manufactured by Armour & Company), 3 parts of beta-pinene and 2 parts of isooctyl beta-mercaptopropionate was extrusion coated on a 1.5 mil thick, biaxially-oriented polyvinyl chloride sheet. The melt temperature of the extrudate was 148° C. and the draw-off rate was adjusted so that a 0.2 mil thick coating was obtained. The resulting coated film was clear, colorless and had excellent surface properties. The coating was firmly adhered to the base sheet.

Application of the same polyvinyl chloride terpolymer composition as described above but which did not contain beta-pinene and 2 parts of isooctyl beta-mercaptopropion-duced a very dark colored film coating.

In a further experiment, a one-gram sample of a composition of 95 parts of the vinyl chloride/vinyl acetate/maleic acid terpolymer described above, 3 parts of beta-piene and 2 parts of isooctyl beta-mercaptopropionate was pressed in a Carver press at 30 tons pressure at 210° C. for varying periods of time and then removed from the press and examined. Films held in the press for as long as 36 minutes were still clear and free of any insoluble particles. A control containing no terpene compound nor thiol turned almost completely black after being heated in the press for less than 9 minutes.

The compositions of this invention are useful in the preparation of shaped structures of all types. They are extremely useful in preparing films, filaments, fibers, foils and the like, and as coatings for wood, metals, etc. However, their greatest ability is in the formation of self-supporting films for packaging applications. These films may be fabricated into sheets, envelopes or tubes and used to package foodstuffs, hardware items, machine parts, etc., or they may be coated with adhesives or magnetic compositions to improve their sealability or to be used as industrial or sound recording tapes, etc.

The invention contemplates the use of a compound selected from the olefinically unsaturated terpenes and their oxygen, hydrocarbon or halogenated derivatives together with a compound selected from the aforementioned group of sulfur-containing compounds. The terpenes or their derivatives may be used singly or in mixtures of terpenes and/or their derivatives as the terpene component. The sulfur-containing compounds likewise may be used singly or in mixtures as the thioorganic component. The present invention also contemplates the use of other ingredients along with the essential additives provided such ingredients do not detract from the function of the essential additives. Thus, the addition of pigments, dyes, delusterants, primary or secondary plasticizers, latent solvents, fillers, lubricants, photostabilizers, etc., in amounts suitable for improving processing or for desired end use characteristics is understood to be within the purview of this invention.

Having fully disclosed the invention, what is claimed is:
1. A composition of matter comprising a polyvinyl chloride polymer, at least 1% of beta-pinene and at least 1% of 1,10-dithiodecane, the sum of the percents of the beta-pinene and the 1,10-dithiodecane being 2–15%.
2. A self-supporting film comprising a polyvinyl chloride polymer, at least 1% of beta-pinene and at least 1% of 1,10-dithiodecane, the sum of the percents of the beta-pinene and the 1,10-dithiodecane being 2–15%.

References Cited by the Examiner

UNITED STATES PATENTS

| 2,310,971 | 2/1943 | Lincoln et al. | 260—45.7 |
| 2,407,396 | 9/1946 | Brubaker | 260—45.7 |
| 2,407,405 | 9/1946 | Dietrich et al. | 260—45.7 |
| 3,004,949 | 10/1961 | Chevassus | 260—45.7 XR |
| 3,054,771 | 9/1962 | Hiestand et al. | 260—45.7 XR |

FOREIGN PATENTS

| 881,939 | 5/1943 | France. |
| 590,286 | 7/1947 | Great Britain. |

OTHER REFERENCES

Smith: British Plastics 27, 176–179 (May 1954).

LEON J. BERCOVITZ, *Primary Examiner.*

MILTON STERMAN, *Examiner.*